United States Patent [19]

Long

[11] Patent Number: 5,100,634
[45] Date of Patent: Mar. 31, 1992

[54] METHOD FOR SULFUR DIOXIDE AND NITROGEN REDUCTION IN BOILER STACKS

[76] Inventor: Joseph F. Long, 1335 Lost Creek Blvd., Austin, Tex. 78746

[21] Appl. No.: 589,032

[22] Filed: Sep. 27, 1990

[51] Int. Cl.$^5$ ...................... C01B 21/00; C01B 17/00
[52] U.S. Cl. .................................... 423/235; 423/242
[58] Field of Search ............. 423/235, 247 A, 235 D, 423/242

[56] References Cited

U.S. PATENT DOCUMENTS

| | | | |
|---|---|---|---|
| 2,862,789 | 12/1958 | Burgess | 423/242 |
| 3,695,829 | 10/1972 | Griffin | 425/242 |
| 3,927,178 | 12/1975 | Jordan | 423/242 |
| 4,372,932 | 2/1983 | Hass | 423/235 |

Primary Examiner—Gregory A. Heller
Attorney, Agent, or Firm—Joseph F. Long

[57] ABSTRACT

A method wherein a boiler stack may be retrofitted for sulfur dioxide removal with ammonium sulfite scrubbing and nitrogen oxide reduction by reaction with chelated iron, and wherein a nitrogeneous fertilizer fortified with chelated iron is produced and stored in a cooling pond for sale as a 50% solution.

14 Claims, 2 Drawing Sheets

METHOD FOR SULFUR DIOXIDE AND NITROGEN REDUCTION IN BOILER STACKS

BACKGROUND OF THE INVENTION

There are numerous articles, studies and patents pertaining to reduction or removal of sulfur dioxide and nitrogen oxides in boiler stack gas. However, sulfur dioxide and nitrogen oxides are not being removed from most boiler stacks in industry because of costs involved and difficulty of installation of usual equipment. We have reviewed all of the following patents:

| Patent No. | Inventor | Date |
| --- | --- | --- |
| 4,690,807 | A. Saleem | 9/1/1987 |
| 4,474,740 | H. Karwat, et al | 10/2/1984 |
| 4,590,048 | A. Spitz | 5/20/1986 |
| 4,248,842 | K. Kaupisch, et al | 2/3/1981 |
| 4,753,784 | D. C. Neuerman | 6/29/1988 |
| 4,565,678 | Clyde W. Zielke, et al | 1/21/1986 |
| 4,268,489 | Egor Huese | 5/19/1981 |

None of these fulfill the major objective of the present invention which is to provide an economical method for sulfur dioxide removal and nitrogen oxide reduction in boiler stack gas. The objective may be realized by scrubbing with ammonium sulfite for sulfur dioxide removal and using chelated iron and ammonia for nitrogen oxide reduction. The method is economical because:

1. use of an engineering design to allow retrofitting installed boiler stacks to act as scrubbers;
2. using a cooling pond for ammonium sulfite oxidation, staok gas cooling, and storage of approximately 50% ammonium sulfate solution that is formed;
3. the chelated iron used for nitrogen oxide reduction is a most desireable addition to the ammonium sulfate-ammonia nitrate fertilizer mixture that is formed; Fertilizers currently sold with chelated iron command a premium price;
4. cooling pond storage allows ammonium sulfate to precipitate during a time of low fertilizer sales and be redissolved during high sales period. The 50% solution could also be evaporated to dryness with the ammonium sulfate bagged for sale; however, relatively local sale as a 50% solution would probably be more economically desireable. Local sale or sale within a 50 mile radius is probable since our calculations indicate that when burning 2% sulfur cool in a 600,000 pph boiler that ammonium sulfate and nitrate mixture is only approximately 96 tons/day. A cooling pond of two to three acres would hold a years production at normal depths but a larger area may be necessary for cooling.

BRIEF SUMMARY OF THE INVENTION

The invention covers a method of scrubbing boiler stack gas using ammonia in a circulating liquid stream to remove essentially all of the sulfur dioxide and much of the nitrogen oxides. Chelated iron is added to the circulating liquid stream to aid in nitrogen oxide removal.

The following parameters pertinent to this invention are known:

1. Sulfur dioxide when scrubbed with an aqueous ammonia solution initially produces ammonium sulfite and ammonium hydrogen sulfite. At temperatures less than 65 degrees C., the ammonium sulfite is stable and at temperatures in the range of 50 to 65 degrees Centigrade will readily oxidize to sulfate if excess oxygen is present. Iron appears to catalyze this reaction.

2. An ammonia containing solution of ammonium sulfate or ammonium sulfite at a pH of 6.2 to 6.8 does not liberate an ammonia plume with aeration.

3. An iron-Edta (ethylene diamine tetra-acetate) complex will react to reduce the NOx in boiler stack gas.

The invention as described in a preferred embodiment uses a circulating stream with 1 to 10 percent, preferably about 2 percent of ferrous iron-Edta complex in an ammonium sulfite-sulfate solution to reduce NOx from the stack exit gas and circulating ammonium sulfite-sulfate solution to scrub out sulfur dioxide by reaction of sulfur dioxide to form ammonium hydrogen sulfite or ammonium bisulfite. Ammonium hydrogen sulfite reacts with ammonia at a pH of 6.2 to 6.8 to form ammonium sulfite. At a pH of 6.2 to 6.8 and less than 60 degrees C., ammonium sulfite is stable and no ammonia is aerated out of the stack gas. A draw off from the circulating ammonium sulfite-sulfate stream is level controlled from a sump, or a stack hold up from below the entering stack gas to the combustion column, and in a preferred embodiment, feeds a cooling pond. In the cooling pond, the ammonium sulfite is oxidized to ammonium sulfate and the solution is also cooled. Sufficient liquid maintained at less than fifty percent ammonium sulfate by make up water addition is recycled from the cold end of the cooling pond through a contactor, which may be spray nozzles or low pressure distillation trays such as shower trays, to maintain stack exit gas at less than 60 degrees C.

Liquid may be held in the cooling pond to reach approximately 50% concentration and may then be withdrawn to sell directly as fertilizer or stored. At above 50% concentration, a precipitate forms. Such precipitate may later be put in solution by water addition for sale at 50% level. This precipitation allows the cooling pond to be used as storage. Depending upon type of soil a plastic lined cooling pond may be preferable.

BRIEF DESCRIPTIONS OF THE DRAWINGS

DETAILED DESCRIPTION OF THE INVENTION

Figure 1:
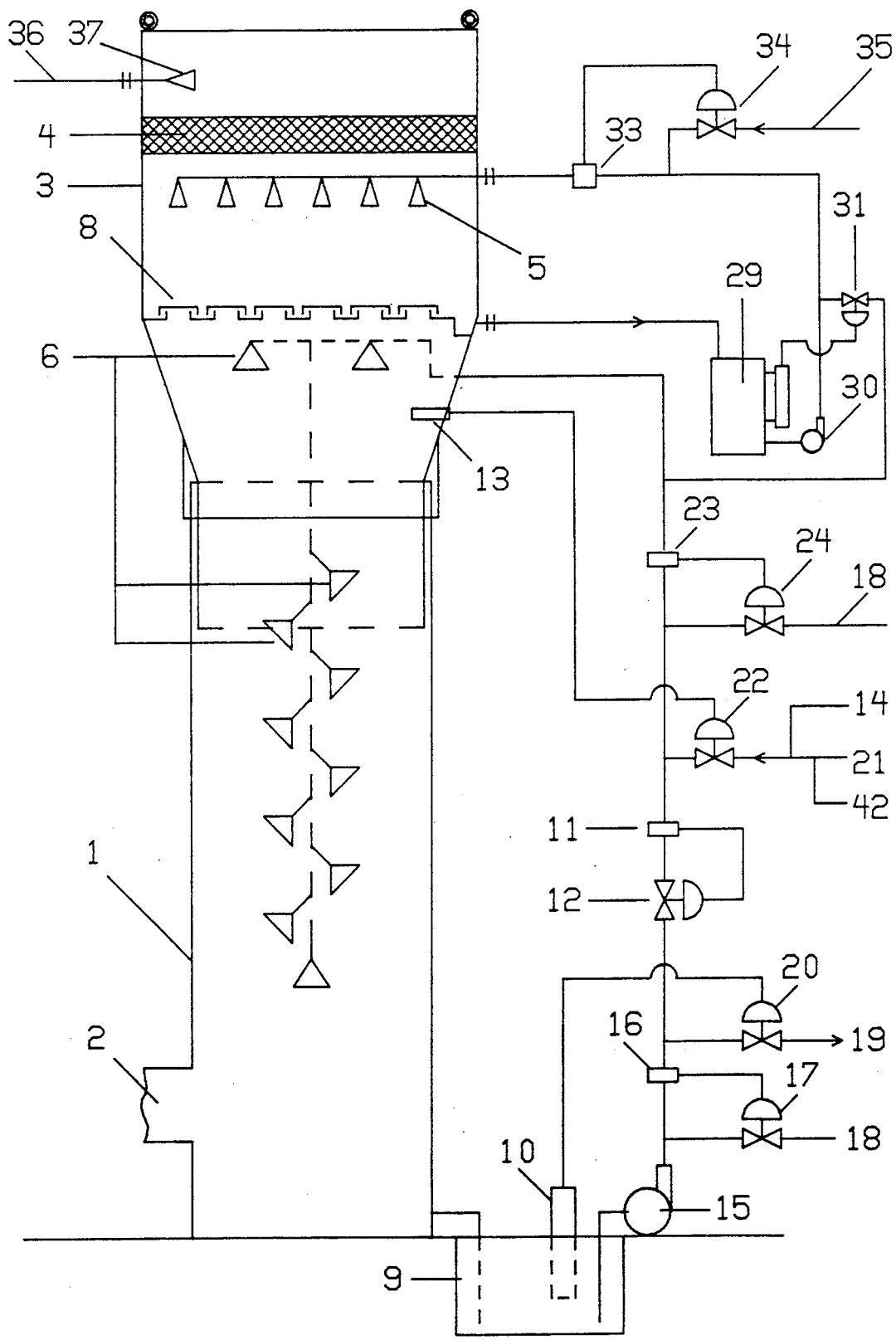
FIG. 1 shows a combustion stack fitted with stack extension for use in this sulfur dioxide and NOx removal process.

The process may best be described from the drawing

The process as depicted in FIG. 1 should be useful for retro-fitting existing in use stacks. The stack extension 3 is designed to set solidly on top of a boiler stack 1 and is of sufficient diameter to reduce stack exit gas velocity to less than 20 ft./second to prevent entrainment through a demister. The demister 4 is periodically water flushed through line 36 and spray nozzle 37. The spray nozzles 5 and 6 as well as demister 4 and distillation tray 8 may be installed in the stack extension before it is placed on top of the column 1. The stack may be equipped to drain to sump 9, and sump 9 may be level controlled by level controller 10 with automatic draw off 20 to feed line 19 going to a cooling means. The cooling means may be a cooling pond, heat exchanger or cooling tower. In most areas, a cooling pond is preferred because when the concentration of ammonium sulfate in the stream reaches approximately 50%, the ammonium sulfate starts to precipitate out so that the cooling pond may also be used as storage. With addition of water the ammonium sulfate redissolves.

The process operates as follows:

(a) aqueous solution, which will build up to ammonium hydrogen sulfite and ammonium sulfite and sulfate, from sump 9 is pumped by pump 15 past pH controller 16 that maintains pH at 6.2 to 6.8, preferably 6.8 by addition of ammonia through line 18 and automatic control valve 17. This addition converts ammonium hydrogen sulfite to ammonium sulfite to ready the solution for further sulfur dioxide removal. The amount of recirculating flow may be set through flow controller 11 controlling automatic valve 12. Temperature controller 13 is set at 60 degrees C. maximum and through automatic valve 22 controls combined flow of make up water 14 and return water 21 from the cooling pond or other cooling means. Make up water 14 is added control ammonium sulfate concentration at less than 50 percent in the combined flow. The pH of the circulating stream is controlled between 6.2 and 6.8 with pH controller 23 acting through valve 24 to admit ammonia flow 18. At this pH there should be no appreciable ammonia loss or ammonia plume from the stack since temperature is being controlled at less than 60 degrees C. and ammonium hydrogen sulfite would react with ammonia to become ammonium sulfite. The ammonium sulfite reacts with sulfur dioxide and water to form ammonium hydrogen sulfite in the stack. Reactions are as follows:

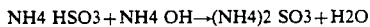

$NH_4 HSO_3 + NH_4 OH \rightarrow (NH_4)_2 SO_3 + H_2O$

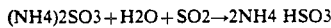

$(NH_4)_2SO_3 + H_2O + SO_2 \rightarrow 2NH_4 HSO_3$

Recirculating flow of ammonium sulfite-sulfate mixture draining from the stack 1, ammonium sulfate returning from the cooling pond, and make up water recycles through contactors 6 such as full cone spray nozzles placed to get maximum stack gas - scrubbing liquid contact.

In a preferred embodiment, about 2% ferrous iron-EDTA, or chelated iron mixture in an ammonium sulfite-sulfate solution is circulating from holdup tank 20 through pump 30 through full cone spray nozzles 5 or other low pressure drop contactor means and caught on valve plate 8 with the reactant liquid being returned to the level controlled hold up tank 29. Make-up of the chelated ferrous Edta mixture is controlled through controller 33 controlling automatic valve 34 to admit the chelated ferrous Edta mixture from line 35. Since temperature controller 13 provides for the cooling water flow to maintain a 60 degree C. temperature and since the gas would be saturated at the temperature, reaction of the chelated iron and NOx would be at about 60 degrees C. Make up flow through line 35 is controlled to give a minimum of 1 ppm iron in the cooling pond stream 21. This may occur since automatic valve 31, which is level controlled from tank 29, discharges to feed to contactors 6 in the stack. This allows for reaction of the iron chelate in the stack 1 below the iron chelate recycle tray 8.

Figure 2:
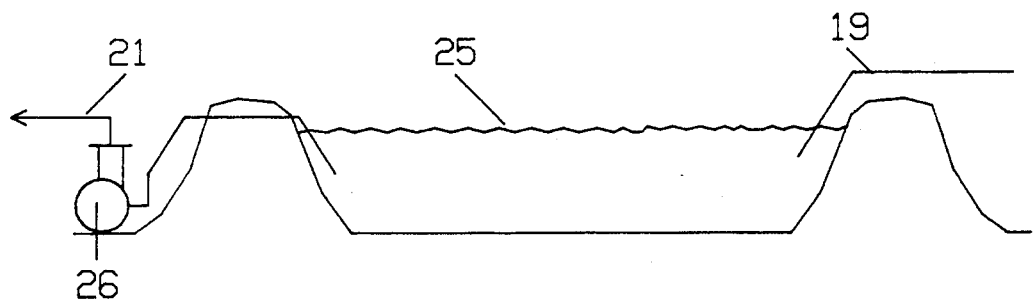
FIG. 2 shows a cooling pond that may be used both for cooling and as storage.

In FIG. 2 we show a cooling pond 25 which is preferably lined with a plastic such as Neoprene or Hypolon. The ammonium sulfite-sulfate solution enters the pond through inlet line 19 and pump 26 returns cooled solution to contactors 6 in stack 1 through line 21. Cooling ponds are normally baffled causing turnover and exposure to air of the liquid being cooled. The iron in the solution reportedly catalyzes the oxidation of ammonium sulfite to ammonium sulfate. At any rate, the oxidation proceeds readily.

Figure 3:
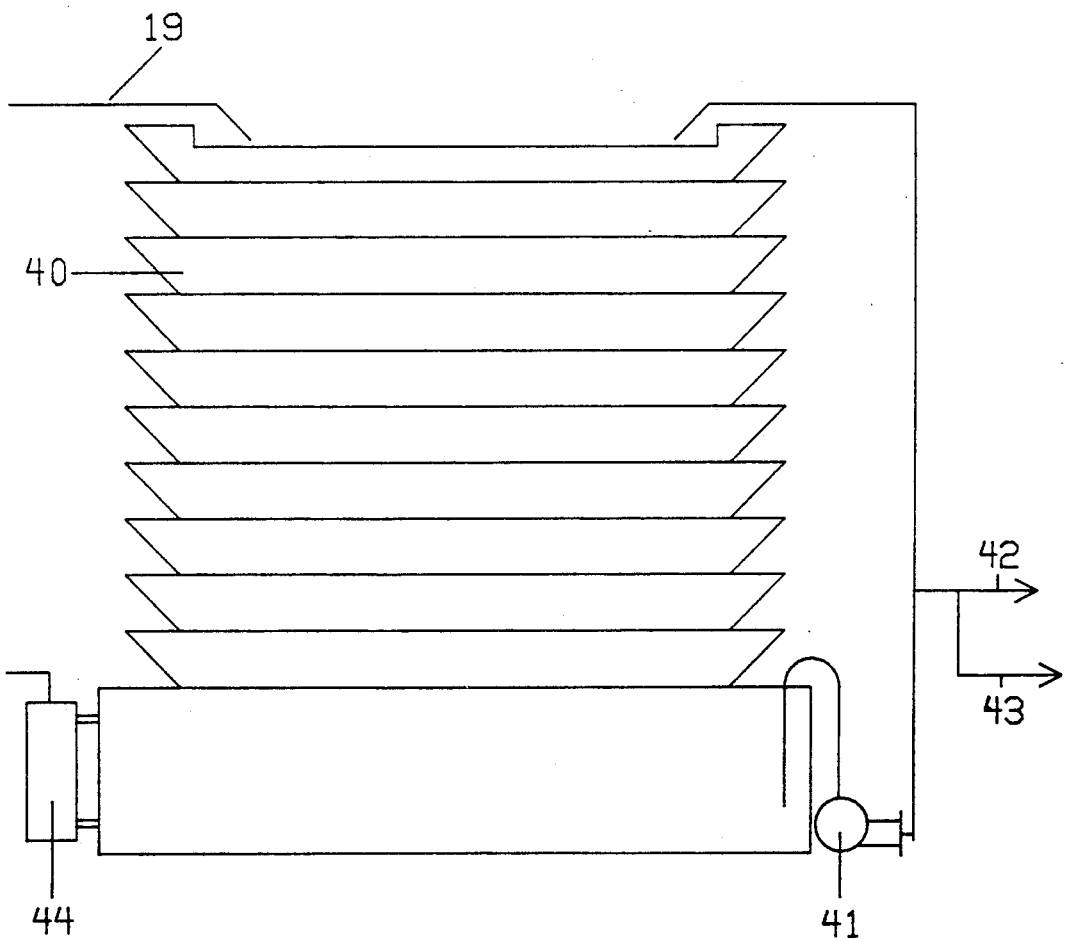
FIG. 3 shows a cooling tower, used for cooling and oxidation.

In FIG. 3 we've shown a normal cooling tower 40 wherein air blown through or pulled through by convection contacts the liquid entering from line 19, to cool by evaporation of water and also provide rapid oxidation of ammonium sulfite to ammonium sulfate. Pump 41 may circulate liquid into the tower, circulate back to the combustion stack through line 42 or through line 43 pump to storage with normal instrumentation. (not shown)

What is claimed is:

1. A method for sulfur dioxide and nitrogen oxide reduction in combustion stack gas effluent comprising:

(a) feeding combustion gases from a boiler through a combustion stack fitted with stack extension of a diameter to reduce exit gas velocity below 20' per second, said stack extension being fitted with a demister and a low pressure drop distillation tray located a minimum of two feet below said demister;

(b) flushing said demister at intervals with water;

(c) feeding through a circulating pump an iron chelate in an ammonia sulfite-sulfate solution through a liquid gas contactor means contiguous to a bottom of said demister while taking a side stream draw-off from said low pressure drop distillation tray to said circulating pump;

(d) feeding an ammonium sulfate solution from a cooling means into a circulating ammonium sulfite-sulfate stream draining from a bottom of said combustion stack while maintaining pH of said circulating ammonia sulfite-sulfate stream at a pH of approximately 6.8 with ammonia addition;

(e) adding make-up water to said circulating ammonium sulfite-sulfate stream to maintain less than 50% ammonium sulfate concentration while circulating sufficient quantity of said ammonium sulfate solution from said cooling means to maintain said combustion stack exit gas at less than 60 degrees C.

(f) feeding sufficient quantity of said iron chelate in said sulfite-sulfate solution taken from said side stream draw off to said ammonium sulfate solution exit said cooling means to maintain a minimum of one ppm iron in said ammonium sulfate solution; and (g) maintaining a level in a sump drainage from said combustion stack by pumping excess of said ammonium sulfite-sulfate solution to said cooling means.

2. A method for sulfur dioxide and nitrogen oxide reduction in combustion stack gas effluent as in claim 1 where said stack extension is removeable.

3. A method for sulfur dioxide and nitrogen oxide reduction in combustion stack gas effluent as in claim 1 wherein said cooling means is a cooling pond.

4. A method for sulfur dioxide and nitrogen oxide reduction in combustion stack gas effluent as in claim 1 wherein said cooling means is a cooling tower and excess ammonium sulfite-sulfate solution flows to a cooling pond for storage.

5. A process for removing oxides of sulfur and oxides of nitrogen from a stack gas stream comprising:

(a) feeding said gas stream to the base of a stack;

(b) flushing with water a demister unit located near a top exit of said stack;

(c) recycling an aqueous scrubbing solution containing ammonium salts while feeding ammonia to maintain a pH above 6.2 to a full cone spray nozzle, centrally located inside said stack and below said demister unit; draining said aqueous scrubbing solution from said stack below an entrance of said gas stream into a level controlled sump feeding to the suction of a pump for said recycling to said full cone spray nozzle;

(d) controlling said level in said level controlled sump by taking a draw off to a cooling pond exit said pump;

(e) pumping from a cooled end of said cooling pond to recycle a portion of cooled solution from said draw off while automatically adding liquid ammonia and water to maintain a pH above 6.2 in a mixture feeding to said full cone spray nozzle;

(f) adding make-up water to said mixture feeding to said full cone spray nozzle to maintain salt concentration in material in said sidestream at less than 50 weight percent;

(g) adding an iron-Edta complex to said aqueous scrubbing solution in sufficient quantity to maintain a minimum of one ppm iron in said aqueous scrubbing solution.

6. A method for sulfur dioxide and nitrogen oxide reduction in combustion stack gas effluent comprising:

(a) feeding combustion effluent gas into a combustion stack equipped with a demister in an expanded stack section, said demister having an area sufficient to reduce effluent gas velocity to less than 20 ft./sec.;

(b) flushing said demister with clean water at periodic intervals;

(c) circulating from a level controlled hold up tank a first reactant liquid, below said demister, through a first gas liquid contator above a distillation tray installed in said expanded stack section of said combustion stack while taking a side stream draw-off from said tray to said hold up tank; said first reactant liquid comprising an aqueous solution of ammonium sulfite, ammonium hydrogen sulfite and ammonium sulfate along with one to five percent of an iron chelate;

(d) flow controlling a feed stream of said first reactant liquid and drawing off liquid from said distillation tray to said hold up tank; level controlling said hold up tank to feed to a second gas liquid contactor below said distillation tray;

(e) recirculating to said second gas liquid contactor sufficient aqueous ammonium sulfate solution from a cooling means to hold appoximately 60 degrees C. below said distillation tray while adding ammonia to control pH at approximately 6.8 and draining from a base of said stack to a sump a liquid comprising said ammonium sulfate solution and sulfites, nitrites and hydrogen sulfites formed by reacting with sulfur dioxide and NOx in said combustion effluent gas;

(f) level controlling said sump by pumping a flow controlled portion of said liquid to said second gas liquid contactor and a level controlled portion of said liquid to maintain level in said sump to said coolin means while adding ammonia to maintain pH at approximately 6.8 at an inlet to said cooling means.

7. A method for sulfur dioxide and nitrogen oxide reduction in combustion stack gas effluent as in claim 6 where said demister is a wire mesh demister.

8. A method for sulfur dioxide and nitrogen oxide reduction in combustion stack gas effluent as in claim 6 where said first gas liquid contactor and said second gas liquid contactor are each a multiplicity of full cone spray nozzles.

9. A method for sulfur dioxide and nitrogen oxide reduction in combustion stack gas effluent as in claim 6 where said cooling mans is a cooling pond designed to cool said liquid draining from said combustion stack to a minimum of 40 degrees C.

10. A method for sulfur dioxide and nitrogen oxide reduction in combustion stack gas effluent as in claim 6 where said cooling means is a cooling tower.

11. A method for sulfur dioxide and nitrogen oxide reduction in combustion stack gas effluent as in claim 6 where said aqueous iron chelate is ferrous-Edta complex.

12. A method for sulfur dioxide and nitrogen oxide reduction in combustion stack gas effluent as in claim 10 where a level in said cooling tower is maintained by diverting a portion of liquid from said cooling tower to an open pit storage.

13. A method for sulfur dioxide and nitrogen oxide reduction in combustion stack gas effluent as in claim 6 where said expanded section is a removable stack extension.

14. A method for sulfur dioxide and nitrogen oxide reduction in combustion stack gas effluent comprising:

(a) installing a demister of a diameter to reduce exit gas velocity in a combustion stack to less than twenty feed per second;

(b) installing a first liquid gas contactor below said demister;

(c) installing a low pressure drop distillation tray with a sidestream liquid draw-off below said first liquid gas contactor; piping said sidestream liquid draw-off to a level controlled hold up tank equipped with a first recirculating pump;

(d) installing a second liquid gas contactor below said distillation tray;

(e) installing below a combustion gas inlet to said stack and in a base of said stack a drain line to drain liquid to a sump;

(f) installing a second reciculating pump and equipment to circulate a portion of liquid drained from said stack through said second gas liquid contactors and circulating remainder to a cooling means while adding ammonis to maintain a pH of about 6.8 at an inlet to said cooling means;

(g) circulating from said cooling means with a third circulating pump through said second gas liquid contactor sufficient liquid to maintain a temperature at about 60 degrees C. below said distillation tray while feeding ammonia to maintain a pH at about 6.8 in said liquid;

(h) pumping a portion of said sidestream liquid draw-off reciculating pump while adding ferrous ethylene diamine tetra-acetate to maintain above a two percent concentration in said portion; feeding to make up liquid stream taken exit said third circulating pump in sufficient amount that a liquid stream exit said first circulating pump to control a level in said level controlled hold up tank and fed into said second liquid gas contactors will result in a minimum of one part per million of iron in said liquid drained to said sump.

* * * * *